United States Patent
Niida

(10) Patent No.: US 9,888,049 B2
(45) Date of Patent: Feb. 6, 2018

(54) TRANSMISSION APPARATUS, INSTRUCTION APPARATUS, TRANSMISSION METHOD, INSTRUCTION METHOD, AND STORAGE MEDIUM

(71) Applicant: CANON KABUSHIKI KAISHA, Tokyo (JP)

(72) Inventor: Mitsuo Niida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 366 days.

(21) Appl. No.: 14/022,021

(22) Filed: Sep. 9, 2013

(65) Prior Publication Data

US 2014/0074977 A1 Mar. 13, 2014

(30) Foreign Application Priority Data

Sep. 11, 2012 (JP) .................................. 2012-199483

(51) Int. Cl.
*G06F 15/16* (2006.01)
*H04L 29/06* (2006.01)
(Continued)

(52) U.S. Cl.
CPC .......... *H04L 65/60* (2013.01); *H04N 5/23203* (2013.01); *H04N 5/772* (2013.01); *H04N 9/8042* (2013.01); *H04N 21/234345* (2013.01); *H04N 21/4223* (2013.01); *H04N 21/4542* (2013.01); *H04N 21/45455* (2013.01);
(Continued)

(58) Field of Classification Search
CPC ....... H04N 21/234345; H04N 21/4542; H04N 21/45455; H04N 9/8042
See application file for complete search history.

(56) References Cited

U.S. PATENT DOCUMENTS

| 8,843,122 B1* | 9/2014 | Wick ................. H04M 3/00 370/310.2 |
| 2004/0036767 A1* | 2/2004 | Yajima ............. G08B 13/19686 348/143 |

(Continued)

FOREIGN PATENT DOCUMENTS

| JP | 2001-069494 A | 3/2001 |
| JP | 2012-090176 A | 5/2012 |

OTHER PUBLICATIONS

ONVIF™ Media Service Specification, Version 2.2, May 2012, relevant pp. 7-14, 25-32, 51.

(Continued)

*Primary Examiner* — Arvin Eskandarnia
*Assistant Examiner* — Austin Moreau
(74) *Attorney, Agent, or Firm* — Canon USA, Inc. I.P. Division

(57) ABSTRACT

The present invention can determine whether to enable or disable a restriction function of viewing an image to be transmitted, for each video stream. There is provided a transmission apparatus configured to transmit a video stream including an image of a part of or a whole of a captured image to a plurality of destinations, and performs a first setting about whether to ON or OFF a viewing restriction function of a first video stream. Further, the transmission apparatus performs a second setting, independently from the first setting, for setting ON or OFF the viewing restriction function for a second video stream different from the first video stream.

28 Claims, 11 Drawing Sheets

(51) Int. Cl.
    *H04N 21/2343*     (2011.01)
    *H04N 21/4223*     (2011.01)
    *H04N 21/454*      (2011.01)
    *H04N 21/4545*     (2011.01)
    *H04N 21/4627*     (2011.01)
    *H04N 21/475*      (2011.01)
    *H04N 21/845*      (2011.01)
    *H04N 5/232*       (2006.01)
    *H04N 5/77*        (2006.01)
    *H04N 9/804*       (2006.01)

(52) U.S. Cl.
    CPC ..... *H04N 21/4627* (2013.01); *H04N 21/4751* (2013.01); *H04N 21/8453* (2013.01); *H04L 63/105* (2013.01)

(56) References Cited

U.S. PATENT DOCUMENTS

| | | | | |
|---|---|---|---|---|
| 2005/0068437 | A1* | 3/2005 | Hayasaka | G08B 13/19682 348/294 |
| 2005/0270372 | A1* | 12/2005 | Henninger, III | G08B 13/19667 348/143 |
| 2006/0179119 | A1* | 8/2006 | Kurosawa | H04L 67/125 709/217 |
| 2007/0024706 | A1* | 2/2007 | Brannon | H04N 7/17318 348/142 |
| 2008/0172361 | A1* | 7/2008 | Wong | H04L 63/123 |
| 2010/0082415 | A1* | 4/2010 | Begue | G06Q 30/06 705/14.11 |
| 2010/0149330 | A1* | 6/2010 | Salgar | G08B 13/19686 348/143 |
| 2010/0269092 | A1* | 10/2010 | Dorman | G06F 9/45512 717/106 |
| 2011/0145574 | A1* | 6/2011 | Ju | H04N 7/181 713/166 |
| 2012/0007866 | A1* | 1/2012 | Tahan | G06F 19/321 345/428 |
| 2012/0059910 | A1* | 3/2012 | Cassidy | G06F 17/30029 709/219 |

OTHER PUBLICATIONS

ONVIF™ Core Specification, Version 2.2, May 2012, relevant pp. 9, 15, 47-51.

\* cited by examiner

FIG.4A
```
<xs:element name="GetStreamUri">
 <xs:complexType>
  <xs:sequence>
   <xs:element name="StreamSetup" type="tt:StreamSetup" />
   <xs:element name="ProfileToken" type="tt:ReferenceToken" />
   <xs:element name="MaskSetup" type="tt:MaskSetup" minOccurs="0" />
  </xs:sequence>
 </xs:complexType>
</xs:element>
```

FIG.4B
```
<xs:complexType name="StreamSetup">
 <xs:sequence>
  <xs:element name="Stream" type="tt:StreamType" />
  <xs:element name="Transport" type="tt:Transport"/>
 </xs:sequence>
</xs:complexType>
```

FIG.4C
```
<xs:simpleType name="ReferenceToken">
 <xs:restriction base="xs:string">
 <xs:maxLength value="64"/>
 </xs:restriction>
</xs:simpleType>
```

FIG.4D
```
<xs:simpleType name="MaskSetup">
 <xs:restriction base="string">
  <xs:enumeration value="ON" />
  <xs:enumeration value="OFF" />
  <xs:enumeration value="AUTO" />
 </xs:restriction>
</xs:simpleType>
```

FIG.4E
```
<xs:simpleType name="StreamType">
 <xs:restriction base="xs:string">
  <xs:enumeration value="RTP-Unicast"/>
  <xs:enumeration value="RTP-Multicast"/>
 </xs:restriction>
</xs:simpleType>
```

FIG.4F
```
<xs:complexType name="Transport">
 <xs:sequence>
 <xs:element name="Protocol" type="tt:TransportProtocol" />
 <xs:element name="Tunnel" type="tt:Transport" minOccurs="0" />
 </xs:sequence>
</xs:complexType>
```

FIG.4G
```
<xs:simpleType name="TransportProtocol">
 <xs:restriction base="xs:string">
  <xs:enumeration value="UDP"/>
  <xs:enumeration value="TCP"/>
  <xs:enumeration value="RTSP"/>
  <xs:enumeration value="HTTP"/>
 </xs:restriction>
</xs:simpleType>
```

FIG.5A

```
<xs:element name="GetStreamUriResponse">
    <xs:complexType>
        <xs:sequence>
            <xs:element name="MediaUri" type="tt:MediaUri" />
        </xs:sequence>
    </xs:complexType>
</xs:element>
```

FIG.5B

```
<xs:complexType name="MediaUri">
    <xs:sequence>
        <xs:element name="Uri" type="xs:anyURI" />
        <xs:element name="InvalidAfterConnect" type="xs:boolean" />
        <xs:element name="InvalidAfterReboot" type="xs:boolean" />
        <xs:element name="Timeout" type="xs:duration" />
    </xs:sequence>
</xs:complexType>
```

FIG.6A

```
<xs:element name="GetServices">
  <xs:complexType>
     <xs:sequence>
        <xs:element name="IncludeCapability" type="xs:boolean" />
     </xs:sequence>
     </xs:complexType>
</xs:element>
```

FIG.6B

```
<tds: GetServicesResponse>
   . . .
   <tds:Service>
      <tds:Namespace>http://www.onvif.org/ver10/media/wsdl</tds:Namespace>
      <tds:XAddr>http://onvif.nvt:80/onvif/media_service</tds:XAddr>
      <tds:Capabilities>
         . . .
         <trt:StreamingCapabilities NonAggregateControl="false"
         RTP_RTSP_TCP="true" RTP_TCP="true" RTPMulticast="true"
         PrivacyMaskON="true" PrivacyMaskOFF="true"
         PrivacyMaskAUTO="false" />
         . . .
      </tds:Capabilities>
   </tds:Service>
   . . .
<tds: GetServicesResponse>
```

FIG.6C

```
<tds: GetServicesResponse>
   . . .
   <tds:Service>
      <tds:Namespace>http://www.onvif.org/ver10/media/wsdl</tds:Namespace>
       <tds:XAddr>http://onvif.nvt:80/onvif/media_service</tds:XAddr>
       <tds:Capabilities>
          . . .
          <trt:PrivacyMaskCapabilities ON="true" OFF="true" AUTO="false" />
          . . .
       </tds:Capabilities>
    </tds:Service>
    . . .
</tds: GetServicesResponse>
```

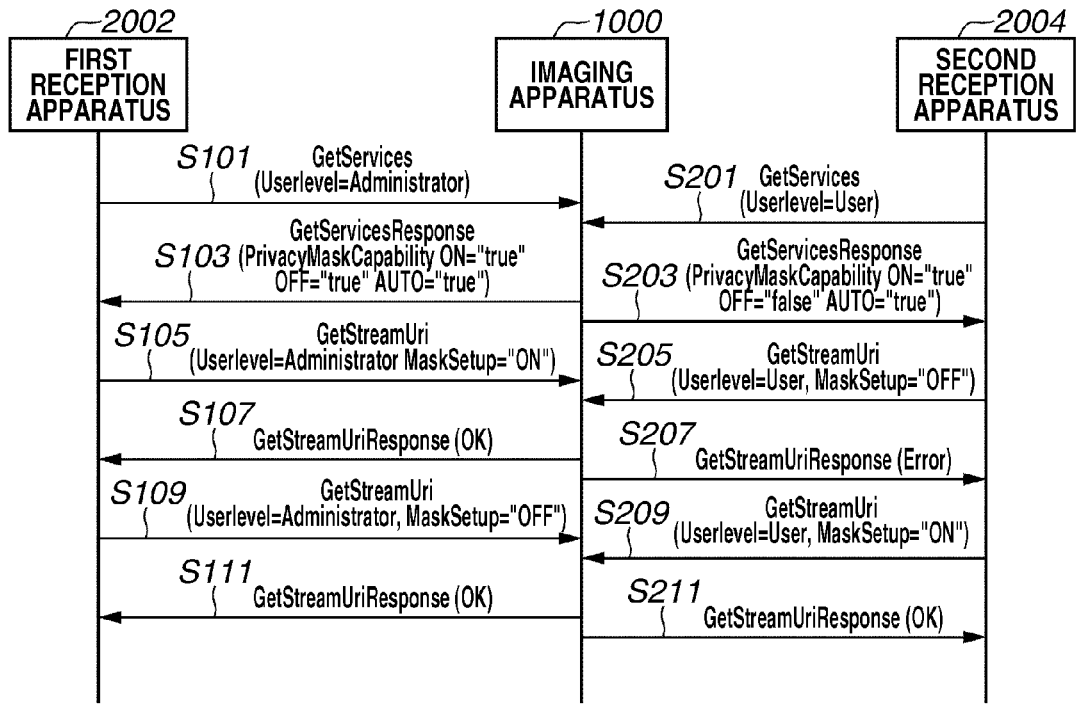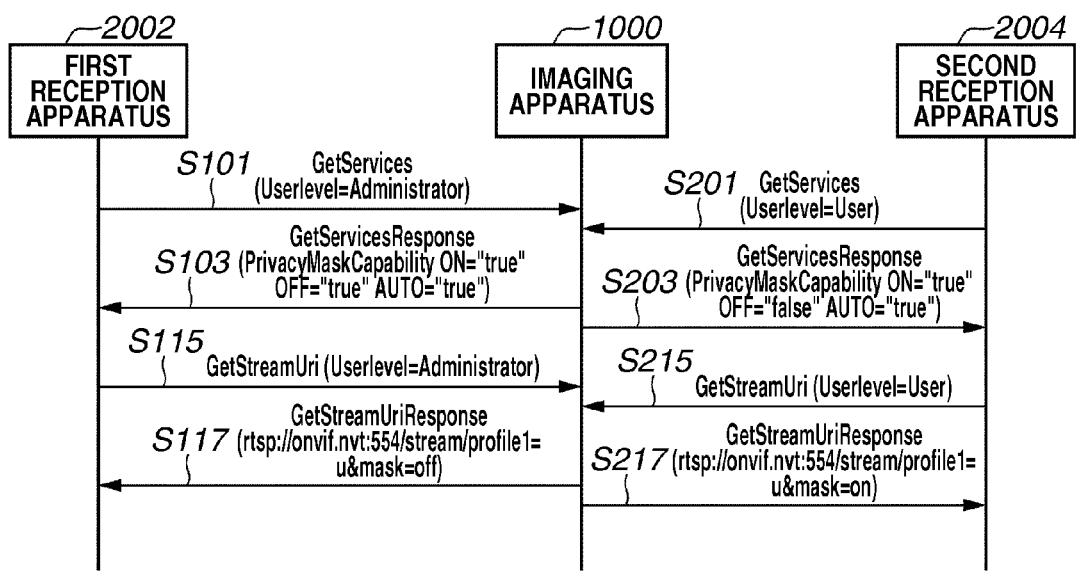

FIG.8A

```
<xs:element name="GetStreamUri">
    <xs:complexType>
        <xs:sequence>
            <xs:element name="StreamSetup" type="tt:StreamSetup" />
            <xs:element name="ProfileToken" type="tt:ReferenceToken" />
        </xs:sequence>
    </xs:complexType>
</xs:element>
```

FIG.8B

```
<xs:complexType name="StreamSetup">
    <xs:sequence>
        <xs:element name="Stream" type="tt:StreamType" />
        <xs:element name="Transport" type="tt:Transport" />
        <xs:element name="MaskSetup" type="tt:MaskSetup"
          minOccurs="0" />
    </xs:sequence>
</xs:complexType>
```

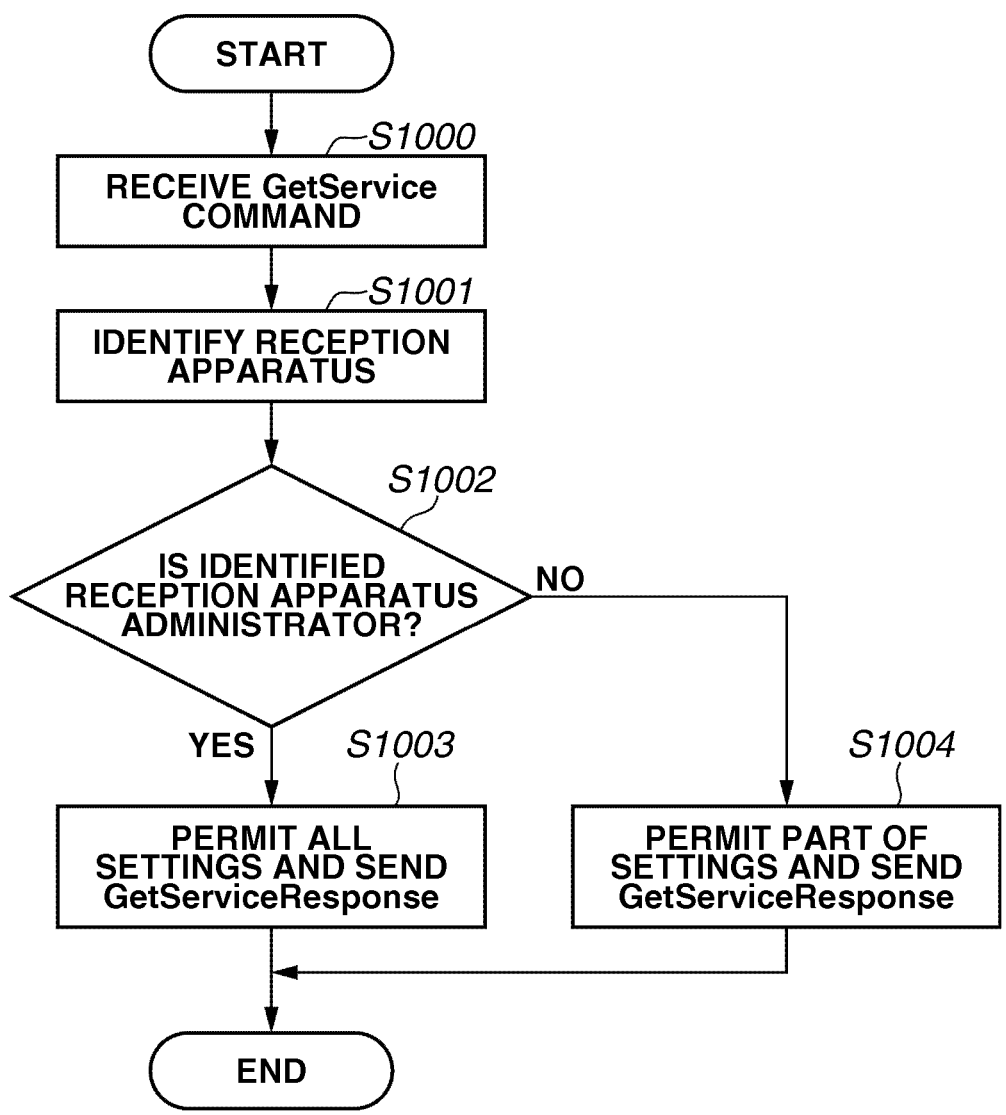

TRANSMISSION APPARATUS, INSTRUCTION APPARATUS, TRANSMISSION METHOD, INSTRUCTION METHOD, AND STORAGE MEDIUM

BACKGROUND OF THE INVENTION

Field of the Invention

The present invention relates to a transmission apparatus for transmitting a video image to a reception apparatus, and more specifically, to a technique for restricting a part of an area of an image included in the video image to be transmitted to the reception apparatus from viewing in the reception apparatus.

Description of the Related Art

Conventionally, when a captured image captured by an imaging apparatus is distributed to a reception apparatus, there is provided a privacy mask function for restricting a part of an area of the captured image from viewing in the reception apparatus. As examples of the privacy mask function, Japanese Patent Application Laid-open No. 2001-69494 discusses functions for marking out a part of an area of a captured image using "On Screen Display" (hereinbelow, referred to as OSD), and reducing the image quality of a part of an area of the captured image.

Further, ONVIF Core Specification, version 2.2 shows a protocol defined by OpenNetwork Video Interface Forum (hereinbelow, referred to as ONVIF) as a protocol for a communication interface between an imaging apparatus and an external apparatus.

When a reception apparatus performs settings of the position, size, shape, and color of the privacy mask function to an imaging apparatus, there may be a method in which the privacy mask function is determined uniquely for the image captured by the imaging apparatus. However, with such a method, if a plurality of video streams captured by the imaging apparatus is transmitted, there is a problem that different privacy mask functions cannot be set for the images included in each stream.

SUMMARY OF THE INVENTION

According to an aspect of the present invention, a transmission apparatus configured to transmit a plurality of video streams including a part of or a whole of a captured image, includes a setting unit configured to perform a first setting for setting whether to restrict viewing a first video stream to be sent to a first destination, and to perform a second setting independently from the first setting for setting whether to restrict viewing a second video stream to be transmitted to a second destination, and a transmission unit configured to transmit the first video stream generated based on the first setting to the first destination, and to transmit the second video stream generated based on the second setting to the second destination.

According to an aspect of the present invention, an instruction apparatus configured to perform an instruction to a transmit transmission apparatus that transmit a video stream including an image of a part of or a whole of a captured image, includes a first instruction unit configured to perform an instruction to the transmission apparatus about an encoding method of a first image included in a first video stream transmitted by the transmission apparatus, or a position for clipping the first image in the first captured image, a second instruction unit on figured to perform an instruction to the transmission apparatus an encoding method of a second image included in a second video stream transmitted by the transmission apparatus or a position for clipping the second image included in the first captured image, a third instruction unit configured to perform an instruction to the transmission apparatus whether to restrict viewing the first video stream, and a fourth instruction unit configured to perform an instruction to transmission apparatus whether to restrict viewing the second video stream.

Further features of the present invention will become apparent from the following description of exemplary embodiments with reference to the attached drawings.

BRIEF DESCRIPTION OF THE DRAWINGS

FIGS. 4A to 4G are diagrams illustrating an example of GetStreamUri command according to the first exemplary embodiment.

FIGS. 5A and 5B are diagrams illustrating an example of GetStreamUriResponse according to the first exemplary embodiment.

FIGS. 6A, 6B, and 6C are diagrams illustrating a definition of a GetServices command and examples of a GetServicesResponse according to the first exemplary embodiment.

FIGS. 7A and 7B are sequence charts illustrating commands and transactions according to a user level.

FIGS. 8A and 8B are diagrams illustrating modification examples of a GetStreamUri command.

FIG. 10 is a flowchart illustrating command response processing according to a user level.

DESCRIPTION OF THE EMBODIMENTS

In the exemplary embodiments described below, an example will be described in which an imaging apparatus and a reception apparatus communicate with each other, using an interface defined in Open NetworkVideo Interface Forum (ONVIF) for discussing the interface of imaging apparatuses.

However, the present invention is not limited thereto, and applicable to a case where an imaging apparatus and a reception apparatus communicate with each other using another method.

Figure 1A:
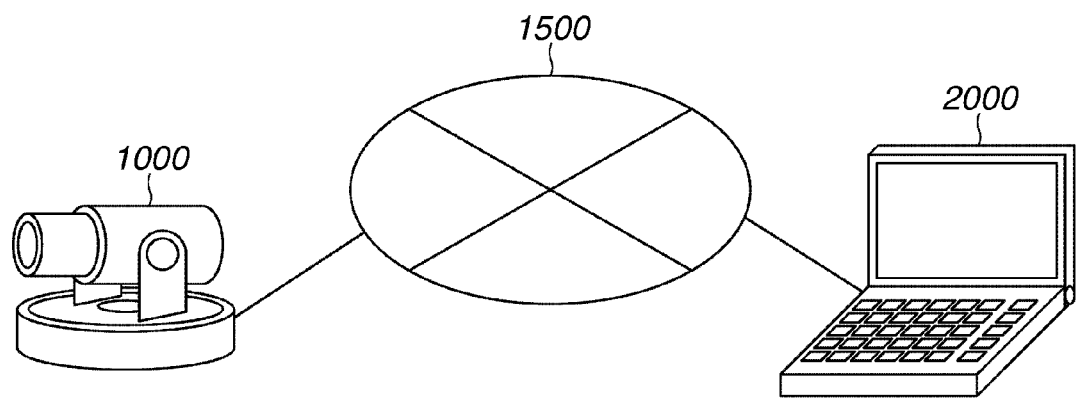
FIGS. 1A and 1B are diagrams illustrating an imaging system according to a first exemplary embodiment of the present invention.

A configuration of an imaging system according to a first exemplary embodiment will be described with reference to FIG. 1A. As illustrated in FIG. 1A, in an imaging system according to the present exemplary embodiment, an imaging apparatus 1000 and a reception apparatus 2000 are connected with each other via a network 1500.

The imaging apparatus 1000 and the reception apparatus 2000 are communicably connected with each other via the network 1500. For example, the network 1500 is configured of the Internet, a wired local area network (LAN), a wireless LAN, a wide area network (WAN). For the network 1500, any communication standard, size, configuration can be used. As a communication standard of LAN, for example, Ethernet (registered trademark) can be used.

The reception apparatus 2000 sends various kinds of commands described below, such as an imaging parameter change, a camera platform drive, and a video streaming start, to the imaging apparatus 1000. The imaging apparatus 1000 is a transmission apparatus that sends a response and a video streaming in response to these commands, to the reception apparatus 2000. The reception apparatus 2000 serves as an instruction apparatus that gives instructions to the transmission apparatus that transmits video streams including a part of or a whole of the captured image. In the present exemplary embodiment, the reception apparatus 2000 is a transmission destination of a plurality of video streams including a part of or a whole of the captured image.

Figure 1B:
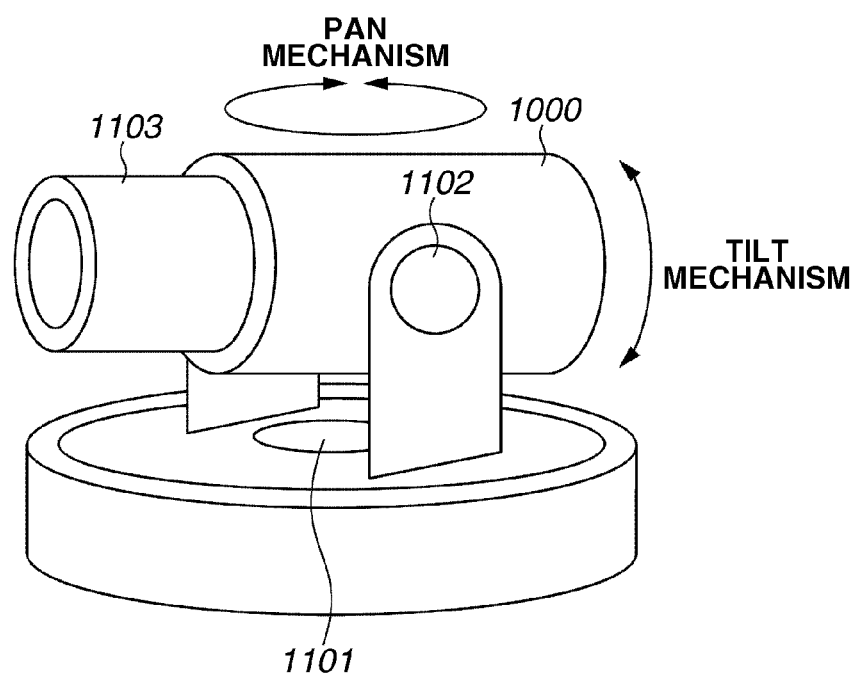

FIG. 1B is a diagram illustrating a configuration of the imaging apparatus 1000 according to the first exemplary embodiment. A pan mechanism 1101 is a mechanism for changing the direction of a lens in a panning direction. In addition, a tilt mechanism 1102 is a mechanism for changing the direction of the lens in a tilting direction. Further, a zoom mechanism 1103 is a mechanism for driving the lens to change the field of view of the imaging apparatus 1000. The imaging apparatus 1000 can change the imaging direction in the panning direction and tilting direction using the pan mechanism 1101 and the tilt mechanism 1102. Further, the imaging apparatus 1000 can perform a zooming operation using the zoom mechanism 1103.

In the present exemplary embodiment, a case where an imaging apparatus has a pan mechanism, a tilt mechanism, and a zoom mechanism, is described. However, the present exemplary embodiment can be applied to the imaging apparatus 1000 having none of or any of mechanisms.

Figure 2:
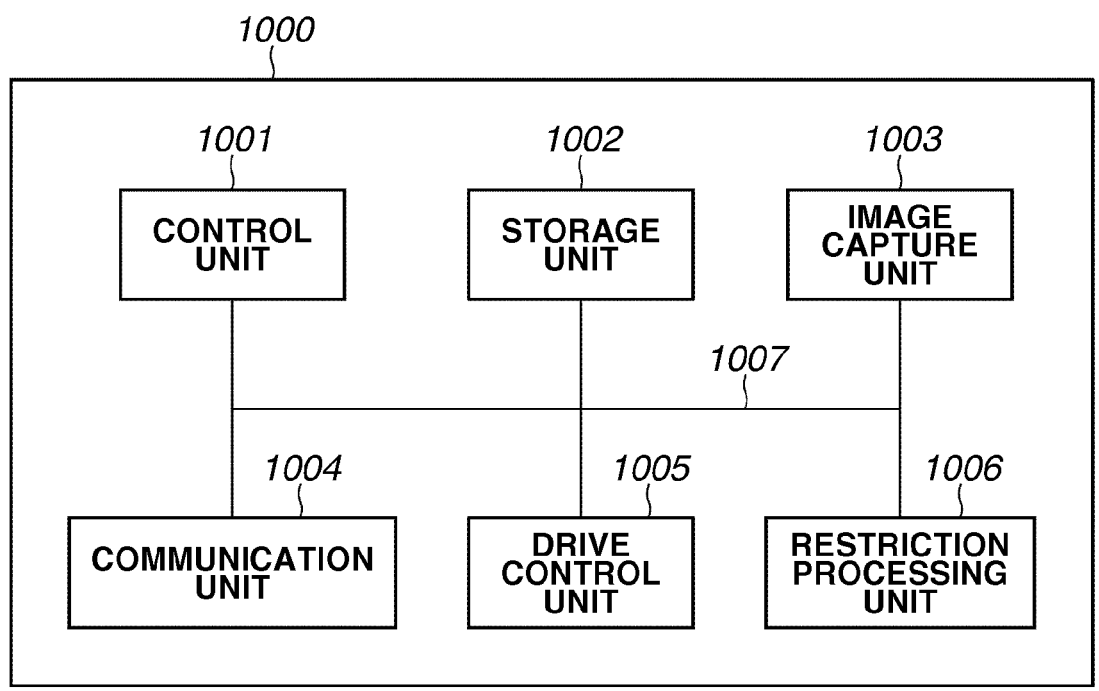
FIG. 2 is a block diagram illustrating a configuration of an imaging apparatus according to the first exemplary embodiment.

Next, an internal configuration of the imaging apparatus 1000 will be described with reference to FIG. 2. A control unit 1001 controls operation of each unit of the imaging apparatus 1000 illustrated in FIG. 2. The control unit 1001 is configured of a processor such as a central processing unit (CPU). When the control unit 1001 is configured as a processor, the control unit 1001 reads and executes a program stored in a storage unit 1002 to control operation of each unit of the reception apparatus 2000 illustrated in FIG. 2. Each unit illustrated in FIG. 2 is connected with each other via a bus 1007.

The storage unit 1002 temporarily stores images captured by an image capture unit 1003 (described below) and output data output from the control unit 1001. When the control unit 1001 includes a processor such as a CPU, the storage unit 1002 stores programs to be executed by the processor. Further, the storage unit 1002 is used to temporarily store parameters to be used when the processor executes the programs. Further, the storage unit 1002 stores communication parameters used when a communication unit 1004 (described below) communicates with the reception apparatus 2000. An example of the communication parameter includes an IP address of the reception apparatus 2000. Further, the storage unit 1002 stores various setting parameters for the imaging apparatus 1000. For example, the storage unit 1002 stores restriction settings for setting restriction contents such as a mask setting for restricting viewing a part of or a whole of the image data configuring a moving image data captured by the imaging apparatus 1000. The contents of the setting parameters of the imaging apparatus 1000 will be described below with reference to FIGS. 9A and 9B.

The storage unit 1002 may be configured of a plurality of different storage media. The storage unit 1002 may be configured of, for example, a random access memory (RAM) or a read only memory (ROM). As the storage unit 1002, removable media may be used. Further, the storage unit 1002 may be configured of an external storage device such as a memory card.

The image capture unit 1003 captures an image of an object to acquire an analog signal, and converts it into digital data. Then, the image capture unit 1003 performs adaptive discrete cosine transform (ADCT) on the digital data to compress the data. Thus, a captured image is generated, and is output to the storage unit 1002. After outputting the captured image to the storage unit 1002, the image capture unit 1003 issues an image acquisition event to the control unit 1001. The image capture unit 1003 includes a lens and an image sensor such as a complementary metal oxide semiconductor (CMOS) sensor. The image sensor converts an image of an object formed by the lens into an image signal.

The communication unit 1004 can receive control commands from the reception apparatus 2000. The control commands are instructions to cause the imaging apparatus 1000 to execute various kinds of processing. In addition, the communication unit 1004 sends a response to the reception apparatus 2000, in response to the control command received from the reception apparatus 2000. Examples of the control commands and the responses with respect to the control commands are described below with reference to FIGS. 3A and 3B.

A drive control unit 1005 controls operations of the pan mechanism 1101, the tilt mechanism 1102, and the zoom mechanism 1103, according to the values of the panning angle, the tilting angle, and the zooming magnification input by the control unit 1001. Further, the drive control unit 1005 notifies the current panning angle value, the current tilting angle value, and the current zooming magnification value to the control unit 1001, in response to the inquiry from the control unit 1001.

A restriction processing unit 1006 superimposes a mask image on the captured image generated by the image capture unit 1003. The position of the mask image in the captured image is specified by the control unit 1001. The control unit 1001 stores the imaging area of the captured image to superimpose the mask image thereon, and the panning angle, the tilting angle, and the zooming magnification, in the storage unit 1002. Further, the control unit 1001 stores, in the storage unit 1002, the position of the mask image in the imaging area as pixel positions in a case where the imaging direction and the angle of view of the imaging apparatus are set as the panning angle, the tilting angle, and the zooming magnification, which are stored in the in the storage unit 1002. The restriction processing unit 1006 superimposes the mask image on the captured image, based on the imaging area, the position of the mask image, the current panning angle, the current tilting angle, and the current zooming magnification of the imaging apparatus 1000, which are stored in the storage unit 1002. The restriction processing unit 1006 has an enable flag for each mask image, and if the flag is "False", the restriction processing unit 1006 performs control not to superimpose the mask image on the captured image.

In the present exemplary embodiment, a case where the restriction processing unit 1006 superimposes a mask image on a captured image, is described. However, it is not limited thereto. For example, the restriction processing unit 1006 may restrict viewing a part of or a whole of the image data configuring moving image data by reducing the image quality of the area of which viewing is to be restricted, or performing filtering process. In this way, the restriction processing unit 1006 restricts viewing a part of or a whole of the image data configuring the moving image data.

In a case where the imaging apparatus 1000 does not have any of the pan mechanism, the tilt mechanism, and the zoom mechanism, the superimposition of the mask image can be performed similar to the above-described example by not using the panning angle, the tilting angle, or the zooming magnification, of which the imaging apparatus does not have the mechanism. Further, in the case where the imaging apparatus 1000 have none of the pan mechanism, the tilt mechanism, and the zoom mechanism, the control unit 1001 stores, in the storage unit 1002, the superimposition position of the mask image in a predetermined imaging area. Then, the restriction processing unit 1006 superimposes the mask image on the captured image, based on the superimposition position of the mask image stored in the storage unit 1002.

The configuration of the imaging apparatus 1000 has been described above with reference to FIG. 2. However, the processing blocks illustrated in FIG. 2 are mere examples for the imaging apparatus according to the present exemplary embodiment, and the configuration of the imaging apparatus 1000 is not limited thereto. The configuration of the imaging apparatus 1000 can be modified and changed within the gist of the present invention. For example, the imaging apparatus 1000 may include an audio input unit for inputting ambient sound or voice, or an audio output unit for outputting audio data received from the reception apparatus.

Next, an example of settings of the imaging apparatus 1000 stored in the storage unit 1002 according to the present exemplary embodiment, will be described with reference to FIGS. 9A and 9B.

Figure 9A:
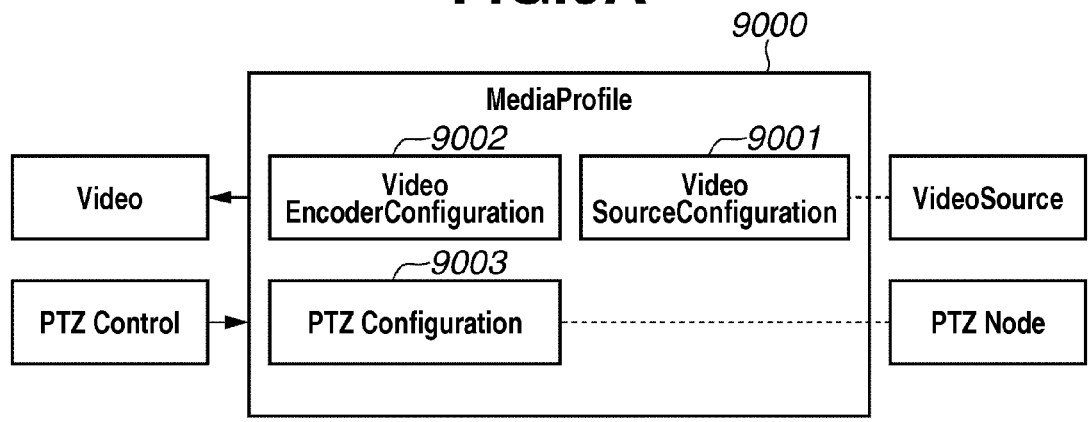
FIGS. 9A and 9B are diagrams illustrating examples of setting parameters held in the imaging apparatus 1000.
Figure 9B:
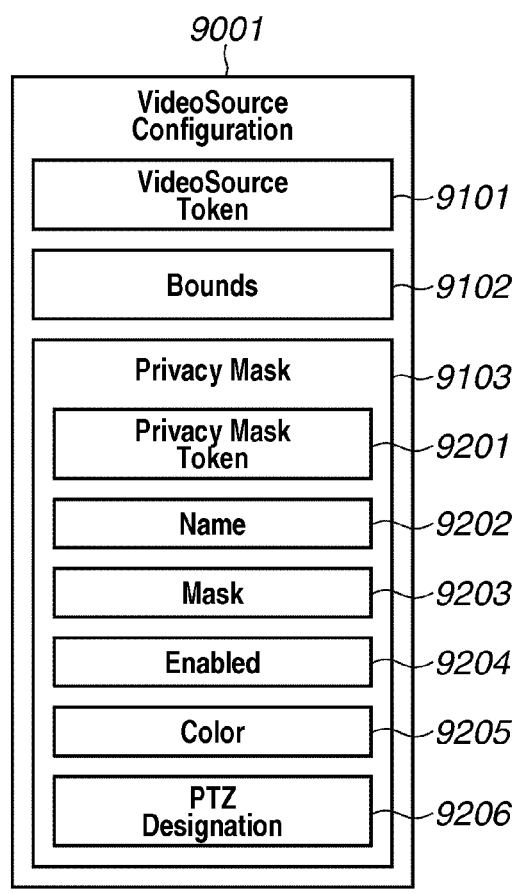

A MediaProfile 9000 illustrated in FIG. 9A is a parameter set for storing various parameters of the imaging apparatus 1000 in an associated manner. In the present exemplary embodiment, the MediaProfile 9000 includes a VideoSourceConfiguration 9001 and a VideoEncoderConfiguration 9002. Further, in the present exemplary embodiment, the MediaProfile 9000 includes a PTZConfiguration 9003, and a PrivacyMaskConfiguration 9004.

The VideoSourceConfiguration 9001 is a set of parameters for associating a VideoSource included in the imaging apparatus 1000 with the MediaProfile 9000. The VideoSource is a set of parameters indicating ability of the image sensor included in the imaging apparatus 1000. In the present exemplary embodiment, the VideoSourceConfiguration 9001 includes a VideoSourceToken and a Resolution. The VideoSourceToken is identification information of the VideoSource, and the Resolution indicates the resolution of the image data which the image sensor can output. The imaging apparatus 1000 can store a plurality of VideoSourceConfigurations 9001.

An example of parameters included in the VideoSourceConfiguration 9001 will be described with reference to FIG. 9B. The VideoSourceConfiguration 9001 includes a VideoSourceToken 9101, a Bounds 9102, and a PrivacyMask 9103.

The VideoSourceToken 9101 is identification information for identifying the VideoSource. The Bounds 9102 is "distribution area data" used for specifying which part is clipped as a distribution image in the image data output by the parameter of the VideoSource.

The PrivacyMask 9103 is a set of parameters holding a list of parameters relating to the privacy mask. In the present exemplary embodiment, the PrivacyMask 9103 includes a PrivacyMaskToken 9201 and a Name 9202. The PrivacyMaskToken 9201 is identification information of the privacy mask, and the Name 9202 is a name of the privacy mask structure. Further, in the present exemplary embodiment, the PrivacyMask 9103 includes Mask 9203 and Enabled 9204. The Mask 9203 specifies the position and the size of the mask by a polygon of three or more points, and the Enabled 9204 is a flag for specifying whether to display the mask on the distribution image. Further, in the present exemplary embodiment, the PrivacyMask 9103 includes a Color 9205 for specifying the color of the mask, and a PTZDesignation 9206 for specifying the position of the camera platform.

In this way, the storage unit 1002 of the imaging apparatus 1000 stores the restriction settings for setting the restriction contents of a part of or a whole of viewing the image data configuring the moving image data captured by the imaging apparatus 1000.

In the present exemplary embodiment, the PTZDesignation 9206 includes a PTZConfigurationToken for specifying a PTZConfiguration. The PTZConfiguration includes the definition of a coordinate system for expressing the direction (panning, tilting) of a camera platform and the zooming magnification. Further, in the present exemplary embodiment, the PTZDesignation 9206 includes a Position for designating the direction and the zooming magnification of the camera platform by the coordinate system indicated in the specified PTZConfiguration.

In the present exemplary embodiment, a case where the PrivacyMask 9103 is held as a parameter in the VideoSourceConfiguration 9001, is described. However, it is not limited thereto, and the PrivacyMask 9103 may be stored directly in the MediaProfile 9000.

Next, the VideoEncoderConfiguration 9002 will be described. The VideoEncoderConfiguration 9002 is a set of parameters included in the MediaProfile 9000 illustrated in FIG. 9A.

The VideoEncoderConfiguration 9002 is a set of parameters for associating the settings relating to encoding to the MediaProfile9000. The imaging apparatus 1000 transmits images according to parameters such as an encoding method (e.g., Joint Photographic Experts Group (JPEG) or H.264), a frame rate, or a resolution, set by the VideoEncoderConfiguration 9002. The imaging apparatus 1000 can hold a plurality of the VideoEncoderConfigurations 9002.

Next, the PTZConfiguration 9003, which is a set of parameters included in the MediaProfile 9000 illustrated in FIG. 9A, is described. The PTZConfiguration 9003 is a set of parameters for associating settings relating to the pan mechanism 1101, the tilt mechanism 1102, and the zoom mechanism 1103 of the imaging apparatus 1000 to the MediaProfile 9000. The PTZConfiguration 9003 includes information relating to a coordinate system for expressing actual panning and tilting angle values of the pan mechanism 1101 and the tilt mechanism 1102, and an actual zooming magnification value of the zoom mechanism 1103. The imaging apparatus 1000 can hold a plurality of PTZConfigurations 9003.

The MediaProfile 9000 can hold a AudioSourceConfiguration, which is a parameter relating to an audio source, other than the parameters illustrated in FIG. 9A. The MediaProfile 9000 can also hold a AudioEncoderConfiguration, which is a parameter relating to compression of an audio source. The MediaProfile 9000 can also include AudioOutputConfiguration and AudioDecoderConfiguration. The AudioOutputConfigurationaudio is a parameter relating to an audio output, and the AudioDecoderConfiguration is a parameter relating to decoding of audio data.

The imaging apparatus 1000 can include a plurality of MediaProfiles 9000. In order to identify each MediaProfile, each MediaProfile is associated with a ProfileToken which is identification information.

Figure 3A:
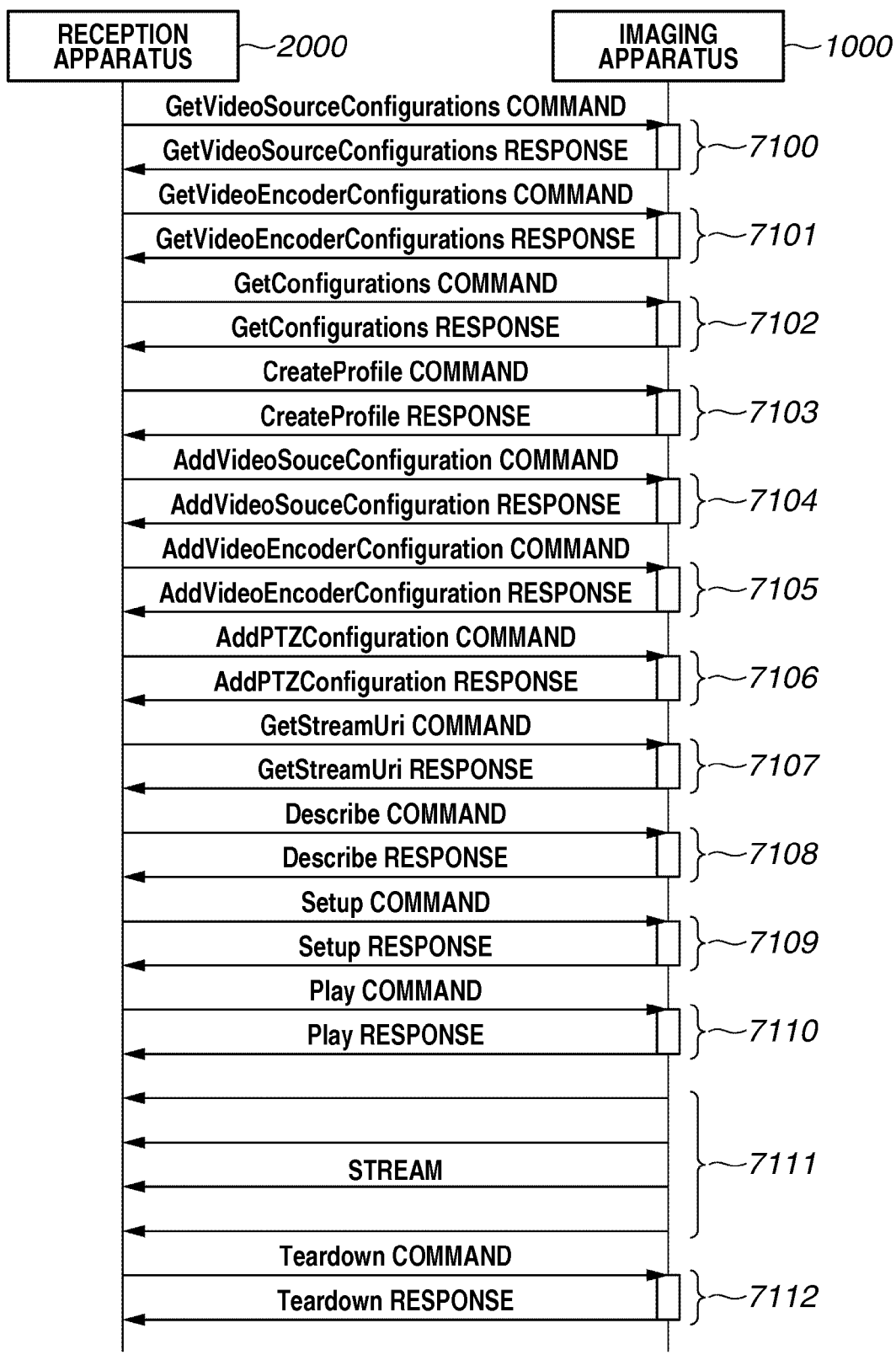
FIGS. 3A and 3B are sequence charts illustrating commands and transactions between the imaging apparatus and a reception apparatus according to the first exemplary embodiment.

Next, a command sequence according to the present exemplary embodiment will be described with reference to FIGS. 3A and 3B. FIG. 3A illustrates an example of a command sequence from the setting start to the video distribution performed between the imaging apparatus 1000 and the reception apparatus 2000 according to the present exemplary embodiment.

First, the reception apparatus 2000 sends a GetVideoSourceConfigurations command to the imaging apparatus 1000. The GetVideoSourceConfigurations command is a command for acquiring the VideoSourceConfiguration 9001. As a response, the imaging apparatus 1000 sends a list of the VideoSourceConfiguration 9001 held in the imaging apparatus 1000 (transaction 7100).

next, the reception apparatus 2000 sends a GetVideoEncoderConfigurations command to the imaging apparatus 1000. The GetVideoEncoderConfigurations command is a command for acquiring the VideoEncoderConfiguration 9002. As a response, the imaging apparatus 1000 sends a list of the VideoEncoderConfiguration 9002 held in the imaging apparatus 1000 (transaction 7101).

Next, the reception apparatus 2000 sends a GetConfigurations command to the imaging apparatus 1000. The GetConfigurations command is a command for acquiring the PTZConfiguration 9003. As a response, the imaging apparatus 1000 sends a list of the PTZConfiguration 9003 held in the imaging apparatus 1000 (transaction 7102).

Next, the reception apparatus 2000 sends a CreateProfile command to the imaging apparatus 1000. The CreateProfile command is a command for creating a new MediaProfile 9000. As a response, the imaging apparatus 1000 creates a new MediaProfile 9000 and sends the ProfileToken thereof to the reception apparatus 2000 (transaction 7103).

Next, the reception apparatus 2000 and the imaging apparatus 1000 perform a transaction of an AddVideoSourceConfiguration command (transaction 7104). Through this transaction, the reception apparatus 2000 can add a desired VideoSourceConfiguration 9001 to the specified MediaProfile 9000.

Next, the reception apparatus 2000 and the imaging apparatus 1000 perform a transaction of an AdddVideoEncoderConfigurtion command (transaction 7105). Through this transaction, the reception apparatus 2000 can add a desired VideoEncoderConfiguration 9002 to the specified MediaProfile 9000.

Next, the reception apparatus 2000 and the imaging apparatus 1000 perform a transaction of an AddPTZConfiguration command (transaction 7106). Through this transaction, the reception apparatus 2000 can add a desired PTZConfiguration 9003 to the specified MediaProfile 9000.

Next, the reception apparatus 2000 and the imaging apparatus 1000 perform a transaction of a GetStreamUri command (transaction 7107). Through this transaction, the reception apparatus 2000 can acquire specification information used for acquiring a media stream according to the setting of the specified MediaProfile 9000 from the imaging apparatus 1000. As the specification information, the reception apparatus 2000 acquires, for example, a Uniformed Resource Identifier (hereinbelow, referred to as URI). With this specification information, the reception apparatus can specify moving image data transmitted by the transmission apparatus.

Then, the reception apparatus 2000 adds a parameter (setting information) for enabling the privacy mask to the GetStreamUri command and sends it to the imaging apparatus 1000. In this way, whether to display the privacy mask can be set for each stream. Alternatively, the reception apparatus 2000 adds a parameter for disabling the privacy mask to the GetStreamUri command and sends it to the imaging apparatus 1000. In this way, the privacy mask can be eliminated for each stream.

As described above, the parameter can include the instruction for transmitting, to the reception apparatus 2000, moving image data in which a part of or a whole of the moving image data configuring the moving image data specified by the reception apparatus 2000 is restricted from viewing. Alternatively, the above-described parameter can include the instruction for transmitting, to the reception apparatus 2000, moving image data configuring the moving image data specified by the reception apparatus 2000 and which is not restricted from viewing.

Alternatively, the reception apparatus 2000 can include an instruction in the above-described parameter to allow the imaging apparatus 1000 to determine whether to enable or disable the privacy mask function without specifying whether to enable or disable the privacy mask function by the reception apparatus 2000 itself.

Further, the above-described parameter can include identification information to identify the reception apparatus 2000 that has sent the GetStreamUri command.

In this way, the reception apparatus 2000 sends, to the imaging apparatus 1000, the setting information used for determining whether to restrict viewing a part of or a whole of the image configuring the moving image data, together with a transmission request for the specification information for specifying moving image data. On the other hand, the imaging apparatus 1000 receives the setting information used to determine whether to restrict viewing the image, together with the transmission request for the specification information for specifying the moving image data.

When the imaging apparatus 1000 receives setting information instructing thereof to enable the privacy mask function, the imaging apparatus 1000 sends, to the reception apparatus 2000, a URI used for receiving a media stream in which the mask image has been superimposed according to the setting of the PrivacyMask 9103.

When the imaging apparatus 1000 receives setting information instructing thereof to disable the privacy mask function, the imaging apparatus 1000 sends, to the reception apparatus 2000, a URI used for receiving a media stream in which the mask image is not superimposed.

When the imaging apparatus 1000 receives setting information instructing thereof to determine whether to enable or disable the privacy mask function, the imaging apparatus 1000 sends, to the reception apparatus 2000, a URI used for receiving a media stream according to the determination of the imaging apparatus 1000.

In this way, the imaging apparatus 1000 can notify a URL for receiving a stream according to the contents of the received setting information as a response to the GetStreamUri command.

In the present exemplary embodiment, the GetStreamUri command can further include information about a stream type indicating whether to request a unicast media stream or a multicast media stream. Further, in the present exemplary embodiment, the GetStreamUri command can include information indicating a series of transmission protocols defining Tunneling of the media stream between different network protocols. Further, the GetStreamUri command can include a Profile Token defining setting for connecting to the stream and indicating the media profile to be used.

Further, in the present exemplary embodiment, the GetStreamUri response includes a URL used for the reception apparatus 2000 receiving a media stream from the imaging apparatus 1000. Further, in the present exemplary embodiment, the GetStreamUri response can include a parameter for defining the expiration date of the URI. Further, in the present exemplary embodiment, the GetStreamUri response can include information indicating that the URI of the stream is valid even if the profile is changed.

Next, the reception apparatus 2000 and the imaging apparatus 1000 perform a transaction of a Describe command (transaction 7108). The reception apparatus 2000 executes the command using the URI acquired in the transaction 7107, and requests to acquire information of contents which the imaging apparatus 1000 performs stream distribution.

Next, the reception apparatus 2000 and the imaging apparatus 1000 perform a transaction of a Setup command (transaction 7109). The reception apparatus 2000 executes the command using the URI acquired in the transaction 7107, and shares the stream transmission method including a session number with the imaging apparatus 1000.

Next, the reception apparatus 2000 and the imaging apparatus 1000 perform a transaction of a Play command (transaction 7110). The reception apparatus 2000 executes the command using the session number acquired in the transaction 7109, and requests starting the stream to the imaging apparatus 1000.

The imaging apparatus 1000 distributes the video stream to the reception apparatus 2000 in response to the stream start request (transaction 7111). The imaging apparatus 1000 distributes the stream requested starting in the transaction 7110, according to the transmission method shared in the transaction 7109.

The imaging apparatus 1000 transmits, to the reception apparatus 2000, a video stream in which a mask image is superimposed according to the setting of the PrivacyMask 9103, when a parameter for enabling the privacy mask function is added to the command received in the transaction 7107. On the other hand, the imaging apparatus 1000 transmits, to the reception apparatus 2000, a video stream in which a mask image is not superimposed, when a parameter for enabling the privacy mask function is not added to the command received in the transaction 7107.

Alternatively, the imaging apparatus 1000 transmits, to the reception apparatus 2000, a video stream in which the mask image is not superimposed, if a parameter for disabling the privacy mask function is added to the command received in the transaction 7107. On the other hand, the imaging apparatus 1000 transmits, to the reception apparatus 2000, a video stream in which the mask image is superimposed according to the setting of the PrivacyMask 9103, if a parameter for disabling the privacy mask function is not added to the command received in the transaction 7107.

In this way, according to the received setting information, the imaging apparatus 1000 transmits, to the reception apparatus 2000, the moving image data in which a part of or a whole of the image configuring the moving image data specified by the reception apparatus 2000 is restricted from viewing, or the image configuring the specified moving image data is not restricted from viewing.

Thus, according to the setting information, the reception apparatus 2000 receives, from the imaging apparatus 1000, the moving image data in which a part of or a whole of the image configuring the specified moving image data is restricted from viewing, or the moving image data in which the image configuring the specified moving image data is not restricted from viewing.

Next, the reception apparatus 2000 and the imaging apparatus 1000 perform a transaction of a Teardown command (transaction 7112). By executing the command using the session number acquired in the transaction 7109, the reception apparatus 2000 requests the imaging apparatus 1000 to stop the stream.

Then, the reception apparatus 2000 adds a parameter for enabling or disabling the privacy mask function or for instructing the imaging apparatus 1000 to determine whether to enable or disable the privacy mask function, to the GetStreamUri command indicated in the transaction 7107, and transmits it to the imaging apparatus 1000.

Figure 3B:
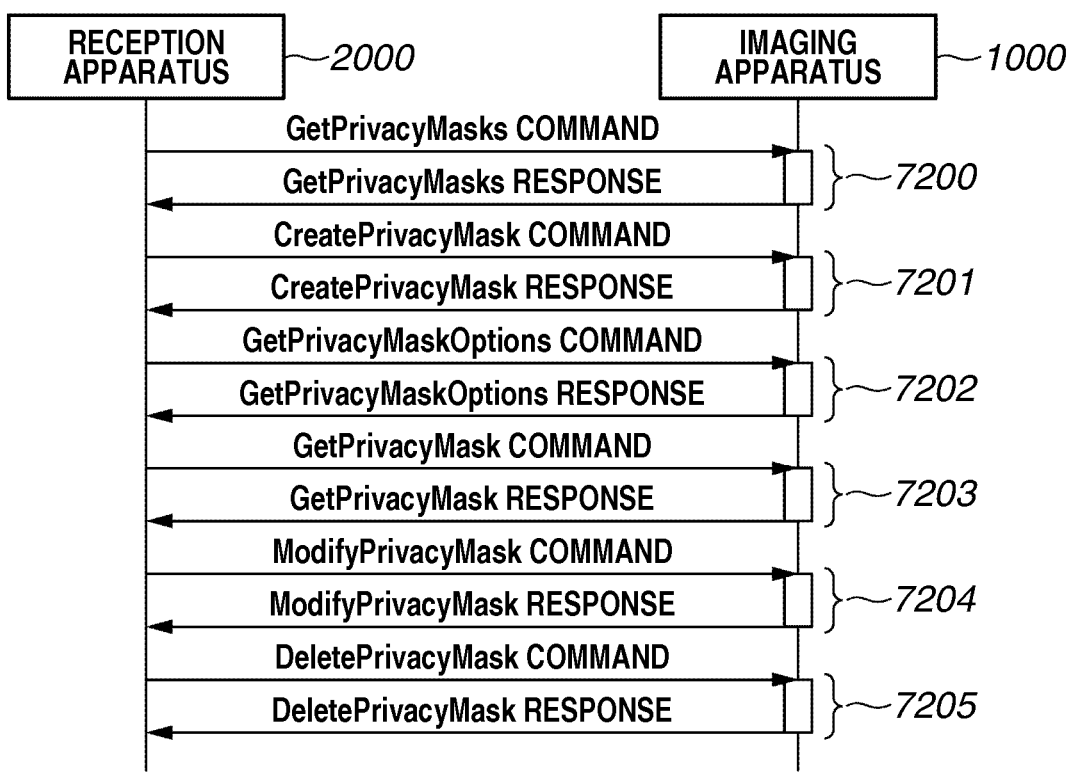

FIG. 3B illustrates a typical command sequence of the mask setting between the imaging apparatus 1000 and the reception apparatus 2000 according to the present exemplary embodiment. Before executing the command sequence described with reference to FIG. 3A, the imaging apparatus 1000 and the reception apparatus 2000 execute the command sequence illustrated in FIG. 3B. With this operation, setting the restriction contents by the restriction processing unit 1006 in the imaging apparatus 1000 can be performed. The setting of the setting contents by the restriction processing unit 1006 is performed by setting the parameter of the above-described PrivacyMask 9103.

First, the reception apparatus 2000 and the imaging apparatus 1000 perform a transaction of a GetPrivacyMask command (transaction 7200).

The GetPrivacyMasks command is a command for the reception apparatus 2000 to instruct the imaging apparatus 1000 to return thereto all the settings of the PrivacyMask 9103 associated with the specified VideoSourceConfiguration 9001.

Next, the reception apparatus 2000 and the imaging apparatus 1000 perform a transaction of a CreatePrivacyMask command (transaction 7201). The CreatePrivacyMask command is a command for the reception apparatus 2000 to instruct the imaging apparatus 1000 to associate the settings of the PrivacyMask 9103 with the specified VideoSourceConfiguration 9001 to generate. By executing the CreatePrivacyMask command, the imaging apparatus 1000 returns, to the reception apparatus 2000, the PrivacyMaskToken 9201 of the generated PrivacyMask 9103.

Next, the reception apparatus 2000 and the imaging apparatus 1000 perform a GetPrivacyMaskOptions transaction (transaction 7202). The GetPrivacyMaskOptions command is a command for the reception apparatus 2000 to instruct the imaging apparatus 1000 to return the selection range or choices of each parameter for the settings of the PrivacyMask 9103. The selection range or choices of each of the parameters for the settings of the PrivacyMask 9103 can be set by using a ModifyPrivacyMask command to be described below.

Next, the reception apparatus 2000 and the imaging apparatus 1000 perform a GetPrivacyMask transaction (transaction 7203). The GetPrivacyMask command is a command for the reception apparatus 200 to instruct the imaging apparatus 1000 to return the settings of the PrivacyMask 9103 waiting for the specified PrivacyMaskToken 9201 associated with the specified VideoSourceConfiguration 9001.

Next, the reception apparatus 2000 and the imaging apparatus 1000 perform a ModifyPrivacyMask transaction (transaction 7204). The ModifyPrivacyMasks command is a command for the reception apparatus 2000 to instruct the imaging apparatus 1000 to edit each parameter included in the PrivacyMask 9103. By executing the ModifyPrivacyMask, the imaging apparatus 1000 can edit the contents of the settings for the PrivacyMask 9103 including the PrivacyMaskToken 9201 specified by the reception apparatus 2000. Through this editing operation, the color, size, and position of the privacy mask can be changed.

Next, the reception apparatus 2000 and the imaging apparatus 1000 perform a DeletePrivacyMask transaction (transaction 7204). The DeletePrivacyMasks command is a command for the reception apparatus 2000 to instruct the imaging apparatus 1000 to delete the settings of the PrivacyMask 9103. By executing the DeletePrivacyMask, the imaging apparatus 1000 deletes, from the storage device, the settings of the PrivacyMask 9103 including the PrivacyMaskToken 9201 specified by the reception apparatus 2000.

In the present exemplary embodiment, by using the command group relating to the settings of the PrivacyMask 9103 described above, a privacy mask can be set on a captured image.

In the present exemplary embodiment, the reception apparatus 2000 adds a parameter for enabling the privacy mask to the GetStreamUri command illustrated in the transaction 7107 in FIG. 3A, and sends it to the imaging apparatus 1000. In this way, whether to display the privacy mask can be set for each stream. Further, the reception apparatus 2000 can delete the privacy mask for each stream, by adding a parameter for disabling the privacy mask, to the GetStreamUri command.

<Structure of GetStreamUri Command>

Next, the structure of the above-described GetStreamUri command will be described with reference to FIGS. 4A to 4G.

FIG. 4A illustrates an example structure of the GetStreamUri command. In the present exemplary embodiment, the GetStreamUri command can set a plurality of parameters whose order of appearance is determined. The first parameter is a parameter called StreamSetup of the StreamSetup type. The second parameter is a parameter called ProfileToken of the ReferenceToken type. The last parameter is a parameter called MaskSetup of the MaskSetup type. The MaskSetup parameter indicates that it can be omitted if the value in the minOccurs field is "0".

FIG. 4B illustrates a definition of the above-described streamSetup type. In the StreamSetup type, a plurality of data whose order of appearance is determined can be held. The first data is data called Stream of the StreamType type, and the second data is data called Transport of the Transport type.

FIG. 4C illustrates a definition of the above-described ReferenceToken type. The ReferenceToken type is a character string type whose character string length is restricted to 64 or fewer characters.

FIG. 4D illustrates a definition of the above-described MaskSetup type. The MaskSetup type is a character string type, and the character string is restricted to any one of ON, OFF, and AUTO. As described above, the reception apparatus 2000 can instruct the above-described GetStreamUri command whether to enable or disable the privacy mask. Alternatively, the reception apparatus 2000 can instruct the imaging apparatus 1000 to determine whether to enable or disable the privacy mask.

In the present exemplary embodiment, the reception apparatus 2000 instructs the imaging apparatus 1000 to enable the privacy mask, if the data value of the above-described MaskSetup type in the above-described GetStreamUri command is ON. On the other hand, if the data value of the above-described MaskSetup type is OFF, the reception apparatus 2000 instructs the imaging apparatus 1000 to disable the privacy mask. On the other hand, if the data value of the above-described MaskSetup type, the reception apparatus 2000 allows the imaging apparatus 1000 to determine whether to enable or disable the privacy mask.

FIG. 4E illustrates a data type definition of the above-described StreamType type. The StreamType type is a character string type, and the value thereof is restricted to Realtime Transport Protocol (RTP)-Unicast, and RTP-Multicast. In the present exemplary embodiment, by setting the data of the above-described StreamType type, the reception apparatus 2000 can instruct the imaging apparatus 1000 whether to transfer the stream in the RTP-Unicast or the RTP-Multicast.

FIG. 4F illustrates a definition of the above-described Transport type. In the Transport type, a plurality of data whose order of appearance is determined is held. The first data is data called Protocol of the TransportProtocol type. The second data is data called Tunnel of the Transport type. The Tunnel data can indicate that it can be omitted, if the value of the minOccurs field in the Tunnel data is "0". In addition, by holding Transport type data in the Transport type data again, recursive data holding is possible.

FIG. 4G illustrates a definition of the above-described TransportProtocol type. The TransportProtocol type is a character string type, and the value thereof is restricted to User Datagram Protocol (UDP), Transmission Control Protocol (TCP), Real Time Streaming Protocol (RTSP), and HyperText Transfer Protocol (HTTP). By setting the value to the data of the above-described TransportProtocol type, the reception apparatus 2000 can instruct the imaging apparatus 1000 to use any one of UDP, TCP, RTSP, and HTTP, as the stream transfer protocol.

With the above-described configuration, in the present exemplary embodiment, instructing the imaging apparatus 1000 whether to enable or disable the privacy mask function is possible, by using a command requesting an output identifier indicating a stream to be received by the reception apparatus 2000. In this way, whether to enable the privacy mask can be determined for each stream.

<Structure of GetStreaUri Response>

Next, the structure of the above-described GetStreaUri Response will be described with reference to FIGS. 5A and 5B.

FIG. 5A illustrates a structure definition of the GetStreaUri Response with which the imaging apparatus 1000 performs a response in response to the above-described GetStreaUri command according to the present exemplary embodiment. In the present exemplary embodiment, the GetStreaUri Response can set a parameter called MediaUri of the MediaUri type.

FIG. 5B illustrates a data type definition of the above-described MediaUri type. In the present exemplary embodiment, to the parameter of the MediaUri type, a plurality of data whose order of appearance is determined can be set.

The first data is data called Uri of the anyUri type. The anyUri type is defined by Extensible Markup Language (XML) standards in advance, and can store Uniform Resource Identifiers (URI).

The second data is data called InvalidAfterConnect of the Boolean type, and if the value is true, it means that the URI stored in the above-described data Uri is valid only until connection is established.

The third data is data called InvalidAfterReboot of the Boolean type. If the value of InvalidAfterReboot is true, it indicates that, if the imaging apparatus 1000 according to the present exemplary embodiment is restarted, the above-described URI stored in the data Uri becomes invalid.

The last data is data called Timeout of the Duration type defined by XML in advance, and it indicates the valid time period of the URI stored in the above-described data Uri. In the present exemplary embodiment, if the value of the Timeout is PT0S, it indicates that the valid time period is infinite.

<Operation when there is No Mask Setting>

As described above, in the present exemplary embodiment, using the CreatePrivacyMask command, the privacy mask setting is created. The imaging apparatus 1000 according to the present exemplary embodiment can be configured not to include the privacy mask setting. In such a case, if the reception apparatus 2000 issues a GetStreamUri in which the above-described MaskSetup value is ON, the imaging apparatus 1000 according to the present exemplary embodiment returns an error response. The error response is configured, for example, to store the value of ter:InvalidArgVal in the above-described GetStreamUriResponse, and to return the error response. Alternately, as the error response, an error response having the value of ter:OperationProhibited may be returned.

In this way, the imaging apparatus 1000 sends an error response to the reception apparatus 2000, when receiving the setting information to be used for determining whether to perform restriction by the restriction processing unit 1006, and if the storage unit 1002 does not hold the restriction setting.

In this way, the case, in which only the setting of enable or disable of the restriction processing for the stream is set even though the contents of the restriction processing to the imaging apparatus 1000 is not set, can be prevented.

In the above-described example, if there is no privacy mask setting, the imaging apparatus 10000 according to the present exemplary embodiment performs an error response, however, the imaging apparatus 1000 according to the present exemplary embodiment may output a video stream to which the privacy mask is not applied, without performing an error response.

<Ability Inquiry Operation by GetServices>

In the present exemplary embodiment, the reception apparatus 2000 can inquire the ability of enabling or disabling the privacy mask function by the GetStreamUri command to the imaging apparatus 1000 by using, for example, the GetServices. Hereinbelow, referring to FIGS. 6A, 6B, and 6C, the inquiry operation will be described.

FIG. 6A illustrates a definition of the above-described GetServices command. As illustrated in FIG. 6A, the GetServices command has a composition including a parameter called IncludeCapability of the Boolean type inside the GetServices tag. If the parameter IncludeCapability is true, the imaging apparatus 1000 according to the present exemplary embodiment returns the ability value relating to the privacy mask in response to the GetServices command.

FIG. 6B illustrates an example GetServicesResponse, which is a response to the above-described GetServices command. There is a tds:Service tag for describing each service inside the tds:GetServicesResponse tag. Inside the tds:Service tag, there are a tds:Namespace tag for specifying a service, and a tds:XAddr tag. In a case of FIG. 6B, the tag indicates a media service. Further, the next tds:Capabilities tag describes the ability of the imaging apparatus 1000.

In the present exemplary embodiment, the privacy mask related ability value of the above-described GetStreamUri command is described, for example, as an attribute in the trt:StreamingCapabilities tag. In FIG. 6B, in the imaging apparatus 1000 according to the present exemplary embodiment, the description of PrivacyMaskON="true" indicates that a GetStreamUri command, in which the above-described MaskSetup value is ON, can be accepted. Similarly, in FIG. 6B, the description of PrivacyMaskOFF="true" indicates that a GetStreamUri command, in which the above-described MaskSetup value is OFF, can be accepted. Further, the description of PrivacyMaskAUTO="false" indicates that a GetStreamUri command, in which the above-described MaskSetup value is AUTO, cannot be accepted.

FIG. 6C illustrates another example of GetServicesResponse. FIG. 6C illustrates a description of the ability value similar to that in FIG. 6B, however, it is an example in which the ability value concerning the above-described privacy mask is described by using a trt:PrivacyMaskCapabilities tag. In FIG. 6C, by each attribute such as ON, OFF, and AUTO in the trt:PrivacyMaskCapabilities tag, the value of above-described MaskSetup in a GetStreamUri command that is acceptable by the imaging apparatus 1000 is described. In FIG. 6C, the description of ON="true" indicates that the GetStreamUri command, in which the MaskSetup value is ON, is acceptable. Further, the description of OFF="true" indicates that a GetStreamUri command, in which the MaskSetup value is OFF, is acceptable. Further, the description of AUTO="false" indicates that a GetStreamUri command, in which the MaskSetup value is AUTO, is not acceptable.

In this way, the reception apparatus 2000 can inquire to the imaging apparatus 1000 whether the setting for receiving the moving image data in which a part of or a whole of the image data constituting the moving image data is restricted from viewing can be performed to the imaging apparatus 1000. Alternatively, the reception apparatus 2000 can inquire to the imaging apparatus 1000 whether the setting for receiving the moving image data in which the image data constituting the moving image data is not restricted from viewing can be performed to the imaging apparatus 1000. Alternatively, the reception apparatus 2000 can inquire to the imaging apparatus 1000 whether the setting for automatically setting enabling or disabling the restriction of viewing a part of or a whole of the image data constituting the moving image data can be performed to the imaging apparatus 1000.

In this way, the imaging apparatus 1000 can present to the reception apparatus 2000 whether setting for the privacy mask function to be enabled or disabled is allowed or not.

<Operation for Setting Whether Instruction to Enable or Disable Privacy Mask Function is Allowed or not for Each Reception Apparatus>

If the ONVIF protocol is used, the imaging apparatus 1000 according to the present exemplary embodiment can identify a user who issues a command by, for example, the Username described in the WS-Security header (hereinbelow, refers to as a WSSE header) included in the command.

In the present exemplary embodiment, the user information is stored and held in the storage unit 1002. Alternatively, the user information may be held in the imaging apparatus 1000 as the information defined in advance. Alternatively, the user information may be newly generated or added by an operator at a time of setting or operating the imaging apparatus 1000. When the user information is newly generated or added by the operator, the user information may be generated or added from an external apparatus using the ONVIF protocol or another protocol. Further, the imaging apparatus 1000 according to the present exemplary embodiment may be directly operated to generate or add the user information.

In the present exemplary embodiment, the user information includes, for example, a character string for identifying a user indicated by the Username, a password or passphrase indicated by the Password, and user level information indicated by the Userlevel.

In the present exemplary embodiment, the user level information is selected, for example, among 4 levels such as Administrator, Operator, User, and Anonymous, and the user information is stored in the imaging apparatus 1000. The user level information roughly indicates an authority of each user to the imaging apparatus 1000. For example, a user who is associated with the above-described Administrator level is a user having an administrator authority.

An operation for setting whether an instruction to enable or disable the privacy mask function for each reception apparatus 2000 is allowed or not in a case where the imaging apparatus 1000 has such user level information, will be described with reference to a flowchart in FIG. 10. In an example in which the control unit 1001 in the imaging apparatus 1000 includes a processor, the processing flow in FIG. 10 illustrates a program for causing the processor included in the control unit 1001 to execute the procedure illustrated in FIG. 10. The processor included in the control unit 1001 is a computer to execute a program read from the storage unit 1002.

In step S1000, the imaging apparatus 1000 receives the above-described GetService command from the reception apparatus 2000. In step S1001, the control unit 1001 of the imaging apparatus 1000 identifies the reception apparatus 2000 that has sent the GetService command based on the above-described Username. In step S1002, the control unit 1001 determines the user level of the identified reception apparatus 2000. In an example illustrated in FIGS. 7A and 7B, in step S1002, the control unit 1001 determines whether the identified reception apparatus 2000 has an administrator authority.

If the identified reception apparatus 2000 has an administrator authority, in step S1003, a GetServicesResponse is output including a description in which all settings are possible (e.g., ON="true", OFF="true", and AUTO="true"). On the other hand, in the present exemplary embodiment, if the identified reception apparatus 2000 has an authority other than the administrator authority, in step S1004, a GetServicesResponse including, for example, values of ON="true", OFF="false", and AUTO="true" is returned to the reception apparatus 2000.

In this way, the imaging apparatus 1000 can send, to the reception apparatus 2000 that has sent the inquiry request, a response indicating whether the setting to the imaging apparatus 1000 for receiving the moving image data in which viewing of the images constituting the moving image data is restricted is allowed. In addition, the imaging apparatus 1000 can send, to the reception apparatus 2000 that has sent the inquiry request, a response indicating whether the setting to the imaging apparatus 1000 for receiving the moving image data in which viewing of the images constituting the moving image data is not restricted is allowed. Further, the imaging apparatus 1000 can send a response indicating whether the setting is allowed to the imaging apparatus 1000 for causing the imaging apparatus 1000 to determine whether the restriction processing is allowed to be enabled or disabled, to the reception apparatus 2000 that has sent the inquiry request to the imaging apparatus 1000.

FIGS. 7A and 7B are sequence charts illustrating above-described operations for determining whether the privacy mask is allowed to be enabled or disabled for each user. FIGS. 7A and 7B each illustrate a sequence between the imaging apparatus 1000, a first reception apparatus 2002, and a second reception apparatus 2004. The operations in FIGS. 7A and 7B, it is assumed that the generation of the privacy mask, and the settings of the position, size, and color of the privacy mask to the imaging apparatus 1000 have been completed in advance.

FIG. 7A is a sequence chart illustrating an operation for notifying choices of the privacy masks which are different for each user level. In FIG. 7A, in step S101, the first reception apparatus 2002 sends the above-described GetServices command to the imaging apparatus 1000.

When the GetServices command is sent in step S101, the first reception apparatus 2002 has a user level of Administrator. In step S103, the imaging apparatus 1000 sends a response (i.e., GetServicesResponse) in response to the above-described GetServices command. The parameters at that time of the GetServicesResponse are set in such a manner that attributes of ON, OFF, and AUTO in the trt:PrivacyMaskCapabilities tag are set, for example, to ON="true", OFF="true", and AUTO="true", respectively.

Next, in step S105, the first reception apparatus 2002 sends a GetStreamUri command in which the MaskSetup parameter is ON. The imaging apparatus 1000 according to the present exemplary embodiment receives the GetStreamUri command, and causes a stream URI (not illustrated), in which the privacy mask is enabled, to be included in the response in step S107 and returns it to the first reception apparatus 2002. Further, in step S107, the imaging apparatus 1000 sends a GetStreamUriResponse, which indicates reception, to the first reception apparatus 2002.

Next, in step S109, the first reception apparatus 2002 sends a GetStreamUri command in which the MaskSetup parameter value is OFF. The imaging apparatus 1000 according to the present exemplary embodiment receives the GetStreamUri command, and returns a stream URI (not illustrated) in which the privacy mask is disabled, to the first reception apparatus 2002. In step S111, the imaging apparatus 1000 sends a GetStreamUriResponse, which indicates reception, to the first reception apparatus 2002.

In FIGS. 7A and 7B, the second reception apparatus 2004 has a user level of User. In step S201, the second reception apparatus 2004 sends a GetServices command to the imaging apparatus 1000. In step S203, the imaging apparatus 1000 sends a GetServicesResponse including PrivaciMaskCapability having attribute values of ON="true", OFF="false", AUTO="true", which are different from those in step S103, to the second reception apparatus 2004.

Next, in step S205, if the second reception apparatus 2004 sends a GetStreamUri command for requesting a stream URI in which the privacy mask is disabled to the imaging apparatus 1000, in step S207, the imaging apparatus 1000 according to the present exemplary embodiment returns an error response.

Next, in step S209, the second reception apparatus 2004 sends a GetStreamUri command for requesting a URI of a stream in which a privacy mask allowed for a user whose user level is User is enabled. Therefore, the imaging apparatus 1000 causes a stream URI (not illustrated), in which the privacy mask is enabled, to be included in the response in step S211, and returns it to the first reception apparatus 2002. In addition, in step S211, the imaging apparatus 1000 sends a GetStreamUriResponse, which indicates reception, to the first reception apparatus 2002.

Through the above-described operation, the imaging apparatus 1000 according to the present exemplary embodiment can present choices concerning enablement and disablement of the privacy mask function, according to the user level. In the above-described exemplary embodiment, based on the user level, choices regarding the enablement and disablement of the privacy mask function are changed. However, it is not limited thereto. As described above, a user name indicated by the Username is associated with the user level and stored. Therefore, the choices of enablement and disablement of the privacy mask function can be changed for each user.

<Operation when GetStreamUri Command has No Additional Information>

As described above, the above-described GetStreamUri command can be issued with the MaskSetup parameter omitted. Hereinbelow, referring to FIG. 7B, an exemplary embodiment in which, when the above-described GetStreamUri command is issued with the MaskSetup parameter omitted, a different privacy mask operation is performed based on the user level, will be described. In FIG. 7B, operations with the same numbers indicate the same operations as those in FIG. 7A.

Referring to FIG. 7B, in step S115, the first reception apparatus 2002 sends a GetStreamUri command to the imaging apparatus 1000. In step S115, the first reception apparatus 2002 sends a GetStreamUri command without including the MaskSetup parameter. The first reception apparatus 2002 has a user level of Administrator. The imaging apparatus 1000 returns a stream URI, in which the privacy mask is disabled for the user level of Administrator, according to the setting predetermined in step S117.

In step S215, the second reception apparatus 2004 sends a GetStreamUri command with the user level of User, to the imaging apparatus 1000. In step S217, the imaging apparatus 1000 according to the present exemplary embodiment returns, to the second reception apparatus 2004, a URI of a stream, in which the privacy mask is enabled, based on that the second reception apparatus 2004 has the user level of User.

<Control According to AccessPolicy>

In the imaging apparatus 1000 according to the present exemplary embodiment, the above-described setting regarding the privacy mask predetermined for each user level is determined based on, for example, an AccessPolicy. In the present exemplary embodiment, the reception apparatus 2000 can acquire the AccessPolicy using a GetAccessPolicy command.

The AccessPolicy is set, for example, for each command. In the present exemplary embodiment, for example, access allowed/prohibited for each user level is indicated like GetStreamUri(MaskSetup:ON)="ynnn", where "y" means "access-allowed" and "n" means "access-prohibited". The order of the descriptions is Administrator, Operator, User, and Anonymous. Thus, in the case of above-described "ynnn", Administrator is access-allowed, and user levels of Operator, User, and Anonymous are access-prohibited. The method for describing the AccessPolicy is not limited to the above-described method, and, needless to say, any method can be employed if it is at least possible to describe access-allowed or access-prohibited for the user levels of Administrator, Operator, User, and Anonymous.

The example of above-described GetStreamUri(MaskSetup:ON)="ynnn" indicates that only the user level of Administrator can issue a GetStreamUri command for enabling the privacy mask. Accordingly, the imaging apparatus 1000 that has received a GetStreamUri command (MaskSetup="ON") for enabling the privacy mask from a user having a user level of Operator, User, or Anonymous, performs an error response in response to the command.

In the above-described example, the AccessPolicy is set as GetStreamUri(MaskSetup:ON), GetStreamUri (MaskSetup:OFF), or GetStreamUri (MaskSetup:AUTO). In this way, the AccessPolicy is set for a combination of a command and a parameter.

A user who has a user level accessible to the SetAccessPolicy command can change the above-described AccessPolicy using the SetAccessPolicy command.

In the above-described example, the AccessPolicy is set for the combination of the command and the parameter. However, AccessPolicy may be set for a request of enabling or disabling the privacy mask function. For example, in such a case, the AccessPolicy for each user level is set for the MaskSetup of the GetStreamUri command like GetStreamUri(MaskSetup)="yyyn".

Alternatively, the AccessPolicy for the above-described GetStreamUri command may be changed based on the presence/absence of privacy mask data that can be acquired by the reception apparatus 2000 using a GetPrivacyMask command. For example, if there is no privacy mask data that can be acquired by the reception apparatus 2000, the imaging apparatus 1000 according to the present exemplary embodiment has the AccessPolicy of GetStreamUri(MaskSetup)="yyyn". Thereafter, if the privacy mask data is created by the CreatePrivacyMask command, the AccessPolicy of the same imaging apparatus may be changed, for example, to GetStreamUri(MaskSetup)="ynnn". If there is privacy mask data, when a user of the user level of Operator, User, or Anonymous sends a GetStreamUri command for changing enabling/disabling the privacy mask function, the imaging apparatus 1000 returns an error response.

As described above, the above-described GetStreamUri command can be issued with the MaskSetup parameter being omitted. In the present exemplary embodiment, enabling/disabling the privacy mask function may be described for each user level in the AccessPolicy. In this case, the imaging apparatus 1000 that has received a GetStreamUri command with the MaskSetup parameter being omitted determines whether to enable or disable the privacy mask function, based on the above-described AccessPolicy, and returns the stream URI.

For example, in the present exemplary embodiment, AccessPolicy can be described as GetStreamUri(MaskStream)="fnnn". In such a description example, if a user of a user level of Administrator sends a GetStreamUri command in which the MaskSetup parameter is omitted, the imaging apparatus that has received it returns a URI of a stream in which the privacy mask is disabled. On the other hand, the imaging apparatus that has received a GetStreamUri command in which the MaskSetup parameter is omitted, from a user whose user level is Operator, User, or Anonymous, returns a URI of a stream in which the privacy mask is enabled.

In other word, enabling or disabling the privacy mask function for each user level is indicated by describing "f" when it is disabled, and "n" if it is enabled. The order of the descriptions is defined as Administrator, Operator, User, and Anonymous.

As described above, the privacy mask data is stored in the MediaProfile as the PrivacyMask. Further, the GetStreamUri command includes the ProfileToken for identifying the MediaProfile. Therefore, the imaging apparatus 1000 can determine whether the MediaProfile that is specified by the GetStreamUri command includes the PrivacyMask or not. Further, as described above, in the present exemplary embodiment, using the AccessPolicy, enabling or disabling the privacy mask function is identified for each user level.

The imaging apparatus according to the present exemplary embodiment may return an error if a user of a user level having no authority to disable the privacy mask function requests a stream of the MediaProfile having no PrivacyMask. For example, a case where the AccessPolicy is GetStreamUri(MaskStream)="fnnn", will be described. If a user having a user level of User issues a GetStreamUri command including a ProfileToken of a MediaProfile having no PrivacyMask, the imaging apparatus according to the present exemplary embodiment performs an error response in response to the command.

Through the operation described above, in the present exemplary embodiment, based on the AccessPolicy, the AccessPolicy for enabling or disabling the privacy mask can be set and changed appropriately.

In the above-described exemplary embodiment, the MaskSetup parameter is directly included in the GetStreamUri command, however, the MaskSetup parameter may be included in the StreamSetup in the GetStreamUri command. In this case, the data type definition is as illustrated in FIGS. 8A and 8B.

According to the present exemplary embodiment, enabling or disabling the restriction function for restricting viewing a transmitted video image can be determined for each video stream.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the present invention has been described with reference to exemplary embodiments, it is to be understood that the invention is not restricted to the disclosed exemplary embodiments. The scope of the following claims is to be accorded the broadest interpretation so as to encompass all such modifications and equivalent structures and functions.

This application claims the benefit of Japanese Patent Application No. 2012-199483, filed Sep. 11, 2012, which is hereby incorporated by reference herein in its entirety.

What is claimed is:

1. A moving image transmission apparatus configured to transmit a plurality of video streams captured by one imaging apparatus to a plurality of moving image reception apparatuses, the moving image transmission apparatus comprising:

a reception unit configured to receive, from a moving image reception apparatus from the plurality of moving image reception apparatuses, a video stream request for acquiring the video stream from the plurality of video streams, the video stream request including setting information used for determining whether to restrict viewing of a part of or a whole of an image; and a transmission unit configured to transmit, to the moving image reception apparatus, a video stream of restricted moving image data in which at least a partial area of an image included in the video stream is restricted from viewing or a video stream of unrestricted moving image data in which an image included in the video stream is not restricted from viewing, according to the setting information received by the reception unit, wherein the reception unit receives, from the moving image reception apparatus, an inquiry request for inquiring whether the moving image reception apparatus is capable of receiving the video stream of the unrestricted moving image data, and wherein the transmission unit transmits, to the moving image reception apparatus, a response to the inquiry request, the response corresponding to authority of the moving image reception apparatus that has transmitted the inquiry request, wherein the inquiry request is independent from the video stream request, wherein the inquiry request is transmitted from the moving image reception apparatus to the reception unit, before transmitting the video stream request including the setting information from the moving image reception apparatus to the reception unit, wherein the transmission unit transmits, to the moving image reception apparatus, the response to the inquiry request, before receiving the video stream request including the setting information from the moving image reception apparatus, and wherein, for each video stream from the plurality of video streams, whether to restrict viewing of a part of or a whole of an image is determined.

2. The moving image transmission apparatus according to claim 1, wherein, when the video stream request has been received by the reception unit, the transmission unit transmits the video stream of restricted moving image data or the video stream of unrestricted moving image data to the moving image reception apparatus, according to the setting information, and wherein the video stream request is a transmission request for transmission of specification information for specifying the video stream.

3. The moving image transmission apparatus according to claim 1, wherein the setting information includes an instruction to cause the transmission unit to transmit the video stream of restricted moving image data to the moving image reception apparatus, or an instruction to cause the transmission unit to transmit the video stream of unrestricted moving image data to the moving image reception apparatus.

4. The moving image transmission apparatus according to claim 1, wherein the setting information includes an instruction to cause the moving image transmission apparatus to determine whether to transmit the video stream of restricted moving image data or the video stream of unrestricted moving image data to the moving image reception apparatus.

5. The moving image transmission apparatus according to claim 1, wherein the setting information includes identification information for identifying the moving image reception apparatus.

6. The moving image transmission apparatus according to claim 1, further comprising a holding unit configured to hold a restriction setting for setting a restriction on viewing a part of or a whole of an image included in the video stream, wherein, in a case where the holding unit does not hold the restriction setting when the reception unit has received the setting information, the transmission unit transmits an error response to the moving image reception apparatus.

7. The moving image transmission apparatus according to claim 1, wherein the inquiry request is an inquiry request, to the moving image transmission apparatus, for inquiring whether an instruction to transmit the video stream of restricted moving image data to the moving image reception apparatus or an instruction to transmit the video stream of unrestricted moving image data to the moving image reception apparatus can be performed on the moving image transmission apparatus.

8. The moving image transmission apparatus according to claim 1, further comprising:

a holding unit configured to hold identification information about a first moving image reception apparatus having authority to receive the video stream of unrestricted moving image data and identification information about a second moving image reception apparatus having no authority to receive the video stream of unrestricted moving image data, wherein, the reception unit receives the identification information for identifying a moving image reception apparatus that has transmitted the inquiry request, and wherein the transmission unit transmits, to the moving image reception apparatus that has transmitted the inquiry request, a response indicating whether the video stream of unrestricted moving image data can be transmitted to the moving image reception apparatus, based on the identification information received by the reception unit and the identification information held by the holding unit.

9. The moving image transmission apparatus according to claim 1, wherein, by superimposing a mask image on a part of or a whole of an image included in the video stream, the part of or the whole of the image included in the video stream is restricted from viewing.

10. The moving image transmission apparatus according to claim 1, wherein, in a case where the reception unit receives the video stream request including the setting information, the transmission unit transmits a video stream according to the setting information or an error response to the moving image reception apparatus, and wherein, in a case where the reception unit receives a video stream request not including the setting information, the transmission unit determines either the video stream of restricted moving image data or the video stream of unrestricted moving image data as a video stream to be transmitted to the moving image reception apparatus, and transmits the video stream determined to be transmitted to the moving image reception apparatus.

11. The moving image transmission apparatus according to claim 1, wherein the response to the inquiry request includes at least one of information indicating whether the moving image reception apparatus is capable of receiving the video stream of restricted moving image data, information indicating whether the moving image reception apparatus is capable of receiving the video stream of unrestricted moving image data, and information indicating whether the moving image transmission apparatus is capable of determining whether either the video stream of restricted moving image data or the video stream of unrestricted moving image data is to be transmitted to the moving image reception apparatus.

12. The moving image transmission apparatus according to claim 1, wherein the reception unit receives, from the moving image reception apparatus, the setting information which is transmitted together with the video stream request.

13. The moving image transmission apparatus according to claim 1, wherein, in a case where the reception unit receives the video stream request for, the transmission unit determines either the video stream of restricted moving image data or the video stream of unrestricted moving image data as a video stream to be transmitted to the moving image reception apparatus, and transmits the video stream determined to be transmitted to the moving image reception apparatus.

14. The moving image transmission apparatus according to claim 1, wherein the response to the inquiry request includes information indicating whether the moving image reception apparatus is capable of receiving the video stream of restricted moving image data, and information indicating whether the moving image reception apparatus is capable of receiving the video stream of unrestricted moving image data.

15. The moving image transmission apparatus according to claim 1, wherein the response to the inquiry request includes information indicating whether the moving image transmission apparatus is capable of determining whether either the video stream of restricted moving image data or the video stream of unrestricted moving image data is to be transmitted to the moving image reception apparatus.

16. The moving image transmission apparatus according to claim 1, wherein the response to the inquiry request includes information indicating whether the moving image reception apparatus is capable of receiving the video stream of restricted moving image data, information indicating whether the moving image reception apparatus is capable of receiving the video stream of unrestricted moving image data, and information indicating whether the moving image transmission apparatus is capable of determining whether either the video stream of restricted moving image data or the video stream of unrestricted moving image data is to be transmitted to the moving image reception apparatus.

17. The moving image transmission apparatus according to claim 1, wherein a whole of an image included in the video stream of restricted moving image data is not restricted from viewing.

18. The moving image transmission apparatus according to claim 1, wherein a response to the inquiry request is transmitted to the moving image reception apparatus before the video stream is transmitted to the moving image reception apparatus.

19. A moving image reception apparatus configured to receive a video stream from a moving image transmission apparatus configured to transmit a plurality of video streams captured by one imaging apparatus to a plurality of moving image reception apparatuses, the moving image reception apparatus comprising:

a transmission unit configured to transmit a video stream request for acquiring the video stream from the plurality of video streams, the video stream request including setting information used for determining whether to restrict viewing of a part of or a whole of an image to the moving image transmission apparatus; and a reception unit configured to receive a video stream of restricted moving image data in which at least a partial area of an image included in the video stream is restricted from viewing or a video stream of unrestricted moving image data in which an image included in the video stream is not restricted from viewing, each of which is transmitted from the moving image transmission apparatus based on the setting information, wherein the transmission unit transmits, to the moving image transmission apparatus, an inquiry request for inquiring whether the video stream of unrestricted moving image data is receivable, and wherein the reception unit receives, from the moving image transmission apparatus, a response to the inquiry request, the response corresponding to authority of the moving image reception apparatus, wherein the inquiry request is independent from the video stream request, wherein the inquiry request is transmitted from the transmission unit to the moving image transmission apparatus, before transmitting the video stream request including the setting information from the transmission unit to the moving image transmission apparatus, wherein the response to the inquiry request is received by the reception unit from the moving image transmission apparatus, before transmitting the video stream request including the setting information to the moving image transmission apparatus, and wherein, for each video stream from the plurality of video streams, whether to restrict viewing of a part of or a whole of an image is determined.

20. The moving image reception apparatus according to claim 19, wherein a response to the inquiry request is transmitted to the moving image reception apparatus before the video stream is transmitted to the moving image reception apparatus.

21. A transmission method for transmitting a plurality of video streams captured by one imaging apparatus to a plurality of moving image reception apparatuses, the method comprising:

receiving a video stream request for acquiring the video stream from the plurality of video streams, the video stream request including setting information used for determining whether to restrict viewing of a part of or a whole of an image;

transmitting, to a moving image reception apparatus from the plurality of moving image reception apparatuses, a video stream of restricted moving image data in which at least a partial area of an image included in the video stream is restricted from viewing or a video stream of unrestricted moving image data in which an image included in the video stream is not restricted from viewing, according to the setting information received;

receiving, from the moving image reception apparatus, an inquiry request for inquiring whether the video stream of unrestricted moving image data is receivable; and transmitting, to the moving image reception apparatus, a response to the inquiry request, the response corresponding to authority of the moving image reception apparatus that has transmitted the inquiry request, wherein the inquiry request is independent from the video stream request, wherein the inquiry request is transmitted from the moving image reception apparatus before transmitting the video stream request including the setting information from the moving image reception apparatus, wherein the response to the inquiry request is transmitted to the moving image reception apparatus before receiving the video stream request including the setting information from the moving image reception apparatus, and wherein, for each video stream from the plurality of video streams, whether to restrict viewing of a part of or a whole of an image is determined.

22. The transmission method according to claim 21, wherein a response to the inquiry request is transmitted to the moving image reception apparatus before the video stream is transmitted to the moving image reception apparatus.

23. A reception method for receiving a video stream from a moving image transmission apparatus configured to transmit a plurality of video streams captured by one imaging apparatus to a plurality of moving image reception apparatuses, the method comprising:

transmitting a video stream request for acquiring the video stream from the plurality of video streams, the video stream including setting information used for determining whether to restrict viewing of a part of or a whole of an image to the moving image transmission apparatus;

receiving a video stream of restricted moving image data in which at least a partial area of an image included in the video stream is restricted from viewing or a video stream of unrestricted moving image data in which an image included in the video stream is not restricted from viewing, each of which is transmitted from the moving image transmission apparatus based on the setting information;

transmitting, to the moving image transmission apparatus, an inquiry request for inquiring whether the video stream of unrestricted moving image data is receivable; and receiving, from the moving image reception apparatus, a response to the inquiry request, the response corresponding to authority of the moving image reception apparatus, wherein the inquiry request is independent from the video stream request, wherein the inquiry request is transmitted to the moving image transmission apparatus, before transmitting the video stream request including the setting information to the moving image transmission apparatus, wherein the response to the inquiry request is received from the moving image transmission apparatus, before transmitting the video stream request including the setting information to the moving image transmission apparatus, and wherein, each video stream from the plurality of video streams, whether to restrict viewing of a part of or a whole of an image is determined.

24. The reception method according to claim 23, wherein a response to the inquiry request is transmitted to the moving image reception apparatus before the video stream is transmitted to the moving image reception apparatus.

25. A non-transitory computer-readable storage medium storing a program for causing a computer of a moving image transmission apparatus, configured to transmit a plurality of video streams captured by one imaging apparatus to a plurality of moving image reception apparatuses, to function as:

a reception unit configured to receive, from a moving image reception apparatus from the plurality of moving image reception apparatuses, a video stream request for acquiring the video stream from the plurality of video streams, the video stream request including setting information used for determining whether to restrict viewing of a part of or a whole of an image; and a transmission unit configured to transmit, to the moving image reception apparatus, a video stream of restricted moving image data in which at least a partial area of an image included in the video stream is restricted from viewing or a video stream of unrestricted moving image data in which an image included in the video stream is not restricted from viewing, according to the setting information received by the reception unit, wherein the reception unit receives, from the moving image reception apparatus, an inquiry request for inquiring whether the moving image reception apparatus is capable of receiving the video stream of unrestricted moving image data, and wherein the transmission unit transmits, to the moving image reception apparatus, a response to the inquiry request, the response corresponding to authority of the moving image reception apparatus that has transmitted the inquiry request, wherein the inquiry request is independent from the video stream request, wherein the inquiry request is transmitted from the moving image reception apparatus to the reception unit, before transmitting the video stream request including the setting information from the moving image reception apparatus to the reception unit, wherein the transmission unit transmits, to the moving image reception apparatus, the response to the inquiry request, before receiving the video stream request including the setting information from the moving image reception apparatus, and wherein, each video stream from the plurality of video streams, whether to restrict viewing of a part of or a whole of an image is determined.

26. The non-transitory computer-readable storage medium according to claim 25, wherein a response to the inquiry request is transmitted to the moving image reception apparatus before the video stream is transmitted to the moving image reception apparatus.

27. A non-transitory computer-readable storage medium storing a program for causing a computer of a moving image reception apparatus, configured to receive a video stream from a moving image transmission apparatus configured to transmit a plurality of video streams captured by one imaging apparatus to a plurality of moving image reception apparatuses, to function as:

a transmission unit configured to transmit a video stream request for acquiring the video stream from the plurality of video streams, the video stream request including setting information used for determining whether to restrict viewing of a part of or a whole of an image to the moving image transmission apparatus; and a reception unit configured to receive a video stream of restricted moving image data in which at least a partial area of an image included in the video stream is restricted from viewing or a video stream of unrestricted moving image data in which an image included in the video stream is not restricted from viewing, each of which is transmitted from the moving image transmission apparatus based on the setting information, wherein the transmission unit transmits, to the moving image transmission apparatus, an inquiry request for inquiring whether the video stream of unrestricted moving image data is receivable, and wherein the reception unit receives, from the moving image transmission apparatus, a response to the inquiry request, the response corresponding to authority of the moving image reception apparatus, wherein the inquiry request is independent independent from the video stream request, wherein the inquiry request is transmitted from the transmission unit to the moving image transmission apparatus, before transmitting the video stream request including the setting information from the transmission unit to the moving image transmission apparatus, wherein the response to the inquiry request is received by the reception unit from the moving image transmission apparatus, before transmitting the video stream request including the setting information to the moving image transmission apparatus, and wherein, each video stream from the plurality of video streams, whether to restrict viewing of a part of or a whole of an image is determined.

28. The non-transitory computer-readable storage medium according to claim 27, wherein a response to the inquiry request is transmitted to the moving image reception apparatus before the video stream is transmitted to the moving image reception apparatus.

* * * * *